(12) United States Patent
Kono

(10) Patent No.: US 8,735,868 B2
(45) Date of Patent: May 27, 2014

(54) SEMICONDUCTOR OPTICAL MODULATOR

(71) Applicant: Sumitomo Electric Industries, Ltd., Osaka (JP)

(72) Inventor: Naoya Kono, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/778,193

(22) Filed: Feb. 27, 2013

(65) Prior Publication Data

US 2013/0234112 A1   Sep. 12, 2013

(30) Foreign Application Priority Data

Mar. 8, 2012   (JP) .................................. 2012-051542

(51) Int. Cl.
*H01L 29/06* (2006.01)
(52) U.S. Cl.
USPC ............................................................ 257/14
(58) Field of Classification Search
USPC .............. 438/29, 31, 608, 933; 257/184, 436, 257/458, E31.055, E31.058, E33.001
See application file for complete search history.

(56) References Cited

FOREIGN PATENT DOCUMENTS

JP      2005-99387      4/2005

*Primary Examiner* — Mark A Laurenzi
(74) *Attorney, Agent, or Firm* — Smith, Gambrell & Russell LLP

(57) ABSTRACT

A semiconductor optical modulator includes a first n-type semiconductor region, a first p-type semiconductor region, an i-type semiconductor region, a second p-type semiconductor region, and a second n-type semiconductor region that constitute a stacked layer structure. The stacked layer structure includes a first cladding layer, a second cladding layer, and a core layer disposed between the first and second cladding layer. The first n-type semiconductor region and the first p-type semiconductor region form a first p-n junction disposed in an intermediate region between the first and second cladding layer. The second p-type semiconductor region and the second n-type semiconductor region form a second p-n junction disposed in the intermediate region or the second cladding layer. The intermediate region, the first n-type semiconductor region, and the second n-type semiconductor region include the core layer, the first cladding layer, and part or all of the second cladding layer, respectively.

10 Claims, 8 Drawing Sheets

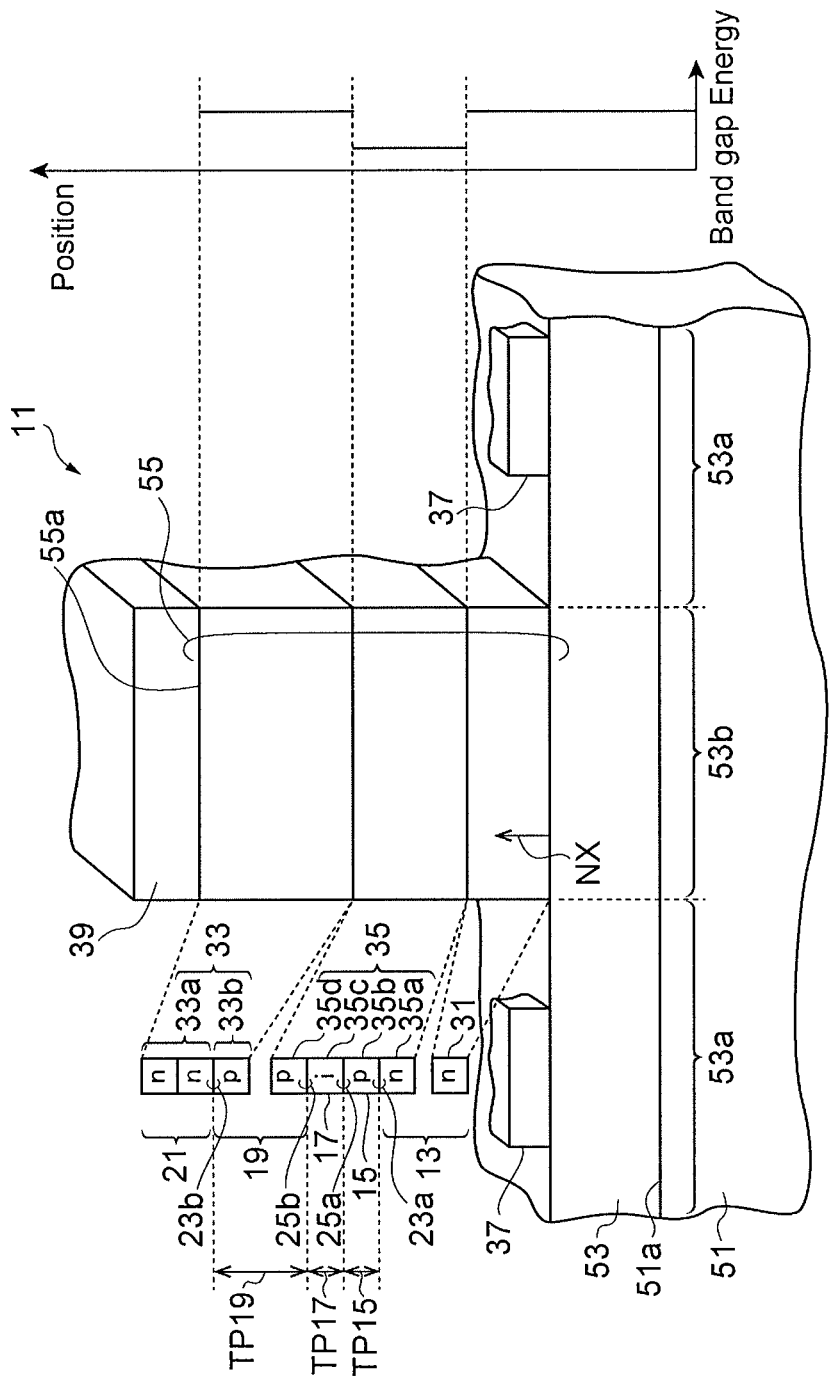

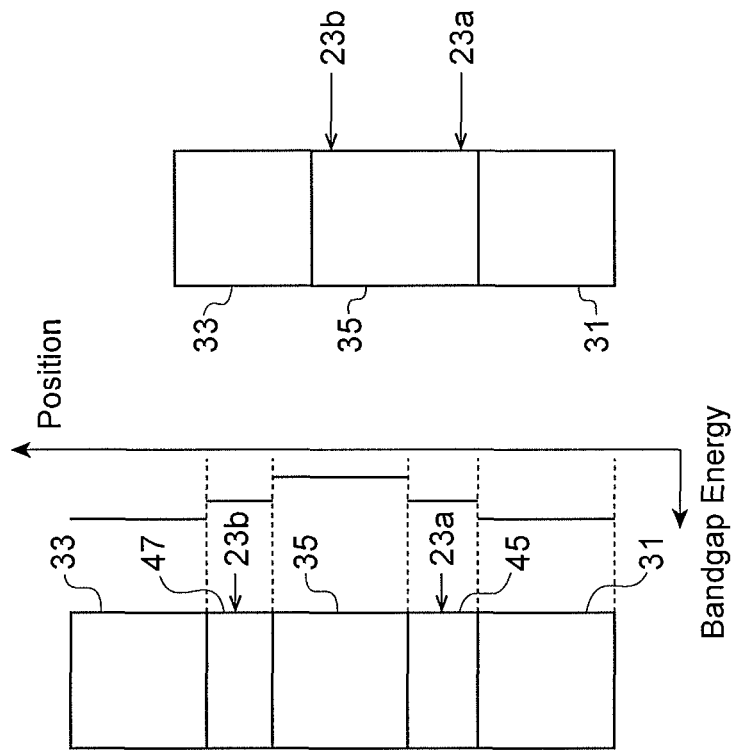
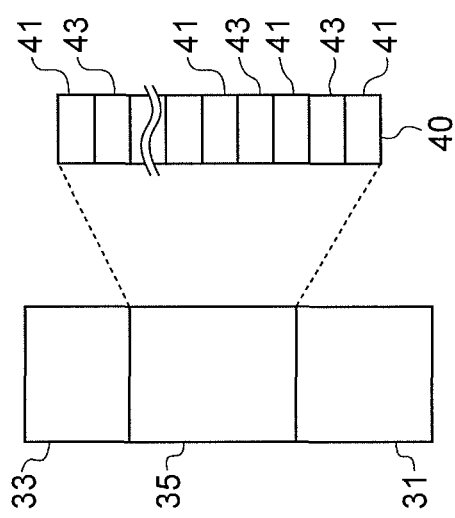
FIG. 2C
FIG. 2B
FIG. 2A

SEMICONDUCTOR OPTICAL MODULATOR

BACKGROUND OF THE INVENTION

1. Field of the Invention

The present invention relates to a semiconductor optical modulator.

2. Description of the Related Art

Patent Literature 1 (Japanese Unexamined Patent Application Publication No. 2005-99387) describes a semiconductor optical modulator. The semiconductor optical modulator includes a single p-n junction in a cladding layer, which is disposed on the outside of a core layer.

The semiconductor optical modulator described in Patent Literature 1 includes a semiconductor optical waveguide having a nin-type heterostructure.

In Patent Literature 1, to prevent carriers generated by optical absorption in the core layer of the optical modulator from being trapped at a heterointerface, an intermediate cladding layer is disposed on the top and bottom of the core layer of the optical modulator. These two intermediate cladding layers on opposite sides of the core layer are made of InGaAlAs having larger bandgap energy than that of the core layer. An InGaAlAs cladding layer having larger bandgap energy than that of the intermediate cladding layers is disposed on the top of one of the intermediate cladding layers. An InGaAlAs cladding layer having larger bandgap energy than the intermediate cladding layers is disposed on the bottom of the other intermediate cladding layer.

SUMMARY OF THE INVENTION

In the optical modulator described in Patent Literature 1, an energy band profile of the nin-type heterostructure is easily controlled. Such a semiconductor optical waveguide having the nin-type heterostructure allows stable operation of the optical modulator. The optical modulator can perform more stable optical modulation without reducing the advantage of a low driving voltage of the semiconductor optical waveguide having the nin-type heterostructure, thereby contributing to low power consumption of the module.

However, the optical modulator described in Patent Literature 1 has a smaller variation of an electric field in the core layer than that of a simple nin-structure having no p-n junction in a cladding layer when a modulated electrical signal (voltage signal) is applied to the optical modulator. Thus, the optical modulator described in Patent Literature 1 has a low modulation efficiency. When a negative voltage is applied to the optical modulator, the depletion region is generated in the vicinity of the p-n junction in the cladding layer. Part of the voltage applied to the optical modulator is applied to the depleted p-n junction in the cladding layer. This reduces the voltage applied to the core layer and reduces the electric field in the core layer.

A semiconductor optical modulator according to the present invention includes (a) a first n-type semiconductor region; (b) a second n-type semiconductor region; (c) a first p-type semiconductor region between the first n-type semiconductor region and the second n-type semiconductor region; (d) a second p-type semiconductor region between the first p-type semiconductor region and the second n-type semiconductor region; and (e) an i-type semiconductor region between the first p-type semiconductor region and the second p-type semiconductor region. The first n-type semiconductor region, the first p-type semiconductor region, the i-type semiconductor region, the second p-type semiconductor region, and the second n-type semiconductor region constitute a stacked layer structure. The stacked layer structure includes a first cladding layer, a second cladding layer, and a core layer disposed between the first cladding layer and the second cladding layer. The first n-type semiconductor region and the first p-type semiconductor region form a first p-n junction disposed in an intermediate region between the first cladding layer and the second cladding layer. The second p-type semiconductor region and the second n-type semiconductor region form a second p-n junction disposed in the intermediate region or the second cladding layer. The intermediate region includes the core layer. The first n-type semiconductor region includes the first cladding layer. The second n-type semiconductor region includes part or all of the second cladding layer. The first p-type semiconductor region and the i-type semiconductor region form a first p-i junction. In addition, the i-type semiconductor region and the second p-type semiconductor region form a second p-i junction.

In this semiconductor optical modulator, the intermediate region includes the first and second p-i junctions, and the core layer in the intermediate region includes the i-type semiconductor region. Thus, when a voltage is applied between the first n-type semiconductor region and the second n-type semiconductor region, the i-type semiconductor region in the core layer is depleted of carriers.

When a voltage between the first n-type semiconductor region and the second n-type semiconductor region is applied, one of the first and second p-n junctions is reverse biased. For example, the first p-n junction is reverse biased. A depletion region is formed in the vicinity of the reverse-biased first p-n junction. Therefore, the p-type semiconductor regions in the core layer are depleted. As a result, an optical absorption due to carriers is reduced in the p-type semiconductor regions in the core layer.

Since the semiconductor region from the first cladding layer to the second cladding layer includes the first and second p-n junctions, a region from the first p-n junction to the second p-n junction acts as a barrier for drift current. Therefore, the drift current is reduced.

In the semiconductor optical modulator according to the present invention, in the first p-n junction, the first p-type semiconductor region preferably has a lower dopant concentration than that of the first n-type semiconductor region.

In the semiconductor optical modulator, the first p-type semiconductor region has a lower dopant concentration than that of the first n-type semiconductor region. Therefore, when the first p-n junction is reverse biased, the first p-type semiconductor region is more depleted than the first n-type semiconductor region. As a result, an optical absorption due to carriers is reduced in the first p-type semiconductor region in the core layer.

In the semiconductor optical modulator according to the present invention, the first p-type semiconductor region preferably has a thickness equal to or larger than the thickness of the second p-type semiconductor region.

When the first or second p-n junction is reverse biased, one of the first and second p-type semiconductor regions is more depleted. Therefore, an optical absorption due to carriers is reduced in the p-type semiconductor regions in the core layer.

The semiconductor optical modulator according to the present invention may further include a first electrode for supplying an electrical potential to the first cladding layer and a second electrode for supplying an electrical potential to the second cladding layer. Preferably, in the first p-n junction, the first p-type semiconductor region includes a portion having a dopant concentration of $4 \times 10^{17}$ cm$^{-3}$ or less. The portion of the first p-type semiconductor region has a thickness of 150 nm or less. Preferably, the first n-type semiconductor region has a dopant concentration of more than $4 \times 10^{17}$ cm$^{-3}$.

In the semiconductor optical modulator, the portion of the first p-type semiconductor region in the vicinity of the first p-n junction is almost completely depleted at zero bias.

In the semiconductor optical modulator according to the present invention, the core layer preferably has a multiple-quantum-well structure including a well layer and a barrier layer, and the material of the well layer and the material of the barrier layer are AlGaInAs and AlInAs, AlGaInAs and AlGaInAs, or GaInAsP and GaInAsP, respectively.

In the semiconductor optical modulator, the combination of the materials of the well layer and the barrier layer (the material of the well layer/the material of the barrier layer) is (AlGaInAs/AlInAs), (AlGaInAs/AlGaInAs), or (GaInAsP/GaInAsP).

In the semiconductor optical modulator according to the present invention, the core layer preferably contains at least one of AlGaInAs and GaInAsP.

In the semiconductor optical modulator, the core layer may include a bulk core region containing at least one of AlGaInAs and GaInAsP.

The semiconductor optical modulator according to the present invention may further include a first optical guide layer between the first cladding layer and the core layer and a second optical guide layer between the second cladding layer and the core layer. Preferably, the first optical guide layer includes the first p-n junction.

In the semiconductor optical modulator, light passing through an optical waveguide of the semiconductor optical modulator is strongly confined in the core layer disposed between the first and second optical guide layers.

In the semiconductor optical modulator according to the present invention, the core layer preferably includes the first p-n junction and the second p-n junction.

In the semiconductor optical modulator, the core layer includes the first p-n junction and second p-n junction. In this case, a large electric field is formed in a region between the first p-n junction and the second p-n junction in the core layer.

In the semiconductor optical modulator according to the present invention, the first p-n junction is preferably disposed in the core layer, and the second p-n junction is disposed in the second cladding layer.

In the semiconductor optical modulator, the core layer includes the first p-n junction. A large electric field is formed in the core layer and a region including the first p-n junction. Therefore, the p-type semiconductor regions in the core layer are almost completely depleted, and an optical absorption loss in the core layer is reduced. In addition, the second p-n junction is disposed in the second cladding layer. Therefore, a small influence of an undepleted p-type semiconductor disposed on the outside of the core layer on an optical absorption in the core layer is obtained.

The semiconductor optical modulator according to the present invention may further include a substrate made of a semi-insulating material; a contact layer made of an n-type semiconductor, the contact layer including a first portion and a second portion arranged on a main surface of the substrate; a first electrode for supplying an electrical potential to the first cladding layer; and a second electrode for supplying an electrical potential to the second cladding layer. The stacked layer structure is disposed on the second portion of the contact layer. The first electrode is disposed on the first portion of the contact layer. The second electrode is disposed on the top surface of the stacked layer structure. In addition, the first cladding layer, the core layer, and the second cladding layer are arranged along a normal line of the main surface of the substrate.

In the semiconductor optical modulator, the first electrode is disposed on the first portion of the contact layer extending on the main surface of the semi-insulating substrate. The distance between the core layer and the electrode (first electrode) disposed on the contact layer is shorter than the distance between the core layer and the electrode in a structure in which the electrode is disposed on the back side of the substrate. Furthermore, use of the semi-insulating substrate can reduce parasitic capacitance.

BRIEF DESCRIPTION OF THE DRAWINGS

FIGS. 1A and 1B are schematic views of a semiconductor optical modulator according to an embodiment of the present invention.

FIGS. 2A to 2C are schematic views of exemplary structures of a semiconductor optical modulator according to an embodiment of the present invention.

DESCRIPTION OF THE PREFERRED EMBODIMENTS

Figure 3:
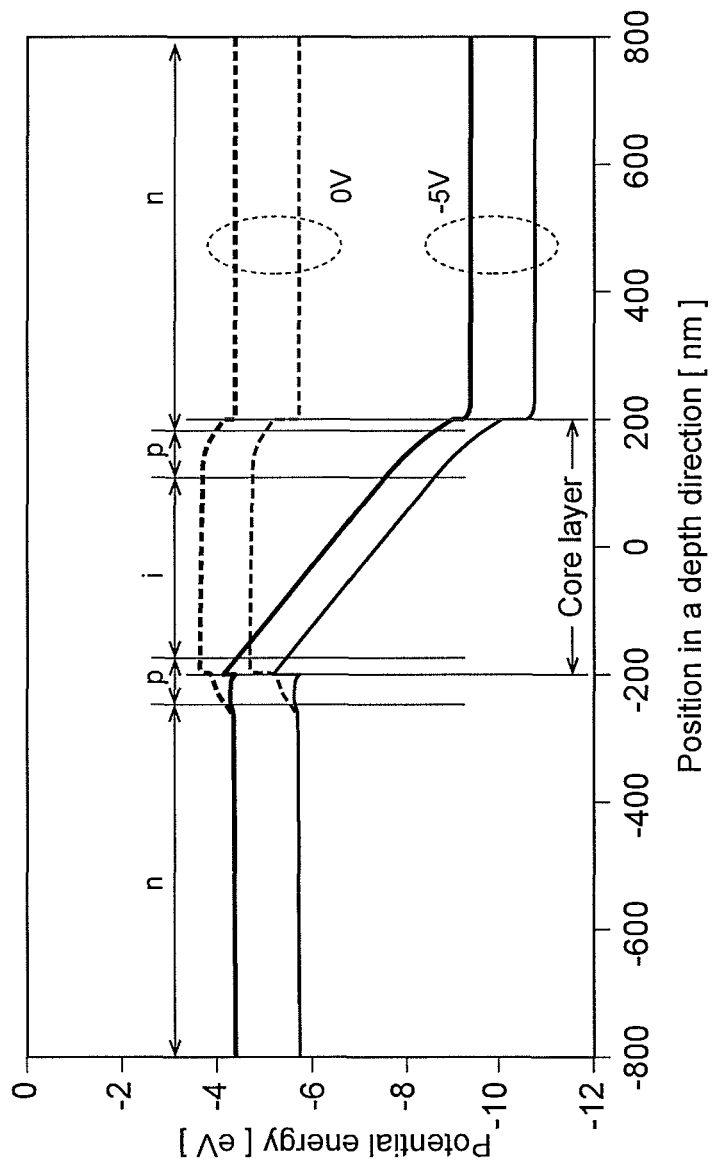
FIG. 3 is a potential profile of a semiconductor optical modulator having a device structure 1 according to an example.

Semiconductor optical modulators according to embodiments of the present invention will be described below with reference to the accompanying drawing. If possible, like reference numerals designate like parts throughout these figures.

FIGS. 1A and 1B are schematic views of a semiconductor optical modulator according to an embodiment of the present invention.

In FIGS. 1A and 1B, a semiconductor optical modulator 11 includes a first n-type semiconductor region 13, a first p-type semiconductor region 15, an i-type semiconductor region 17, a second p-type semiconductor region 19, and a second n-type semiconductor region 21. The first p-type semiconductor region 15 is disposed between the first n-type semiconductor region 13 and the second n-type semiconductor region 21. The second p-type semiconductor region 19 is disposed between the first p-type semiconductor region 15 and the second n-type semiconductor region 21. The i-type semiconductor region 17 is disposed between the first p-type semiconductor region 15 and the second p-type semiconductor region 19. The first n-type semiconductor region 13 and the first p-type semiconductor region 15 form a first p-n junction 23a. The second p-type semiconductor region 19 and the second n-type semiconductor region 21 form a second p-n junction 23b. The first n-type semiconductor region 13 includes a first cladding layer 31. The second n-type semiconductor region 21 includes part or all of a second cladding layer 33. Part or all of the first p-type semiconductor region 15, the i-type semiconductor region 17, and part or all of the second p-type semiconductor region 19 constitute a core layer 35. The core layer 35 includes a first p-i junction 25a and a second p-i junction 25b. In the core layer 35, the first p-i junction 25a is disposed between the first p-type semiconductor region 15 and the i-type semiconductor region 17. The second p-i junction 25b is disposed between the i-type semiconductor region 17 and the second p-type semiconductor region 19. The core layer 35 is disposed between the first cladding layer 31 and the second cladding layer 33. Here, the i-type semiconductor region or the i-type semiconductor layer is an undoped semiconductor region or an undoped semiconductor layer in which no impurity is intentionally doped. Usually, the i-type semiconductor region (or the i-type semiconductor layer) has a low impurity concentration of $1 \times 10^{16}$ cm$^3$ or less.

In the semiconductor optical modulator 11, the core layer 35 includes the first p-i junction 25a and the second p-i junction 25b, and the i-type semiconductor region 17 is disposed in the core layer 35 between the first p-i junction 25a and the second p-i junction 25b. Thus, when a voltage is applied between the first n-type semiconductor region 13 and the second p-type semiconductor region 19, the depletion region is formed in the i-type semiconductor region 17 in the core layer 35.

When a voltage is applied between the first n-type semiconductor region 13 and the second n-type semiconductor region 21, one of the first p-n junction 23a and the second p-n junction 23b is reverse biased. A depletion region is formed in the vicinity of the reverse-biased p-n junction (for example, the first p-n junction 23a). Accordingly, one of the p-type semiconductor regions (for example, a layer 35b) in the core layer 35 is depleted of carriers. As a result, an optical absorption loss due to carriers is reduced.

The first p-n junction 23a and the second p-n junction 23b are disposed in a region from the first cladding layer 31 to the second cladding layer 33. A region from the first p-n junction 23a to the second p-n junction 23b acts as a barrier for drift current. Therefore, the drift current is reduced for the semiconductor optical modulator 11.

In FIGS. 1A and 1B, the first p-type semiconductor region 15 is disposed on the first n-type semiconductor region 13. The i-type semiconductor region 17 is disposed on the first p-type semiconductor region 15. The second p-type semiconductor region 19 is disposed on the i-type semiconductor region 17. The second n-type semiconductor region 21 is disposed on the second p-type semiconductor region 19. The first cladding layer 31 includes an n-type semiconductor layer 31. The second cladding layer 33 includes an n-type semiconductor layer 33a and a p-type semiconductor layer 33b. In addition, the n-type semiconductor layer 33a includes an n-type semiconductor layer 33a1 and an n-type semiconductor layer 33a2 having a higher impurity concentration than that of the n-type semiconductor layer 33a1. The core layer 35 includes an n-type semiconductor layer 35a, a first p-type semiconductor layer 35b, an i-type semiconductor layer 35c, and a second p-type semiconductor layer 35d.

In the present embodiment, the first p-n junction 23a is disposed in the core layer 35, and the second p-n junction 23b is disposed in the second cladding layer 33. Both the first p-n junction 23a and the second p-n junction 23b may be disposed in the core layer 35.

In the semiconductor optical modulator 11, the thickness TP15 of the first p-type semiconductor region 15 is different from the thickness TP19 of the second p-type semiconductor region 19. When the first p-n junction 23a or the second p-n junction 23b is reverse biased, one of the first p-type semiconductor region 15 and the second p-type semiconductor region 19 is more depleted. Therefore, an optical absorption due to carriers is reduced in the p-type semiconductor regions in the core layer.

For example, the thickness TP15 of the first p-type semiconductor region 15 is equal to or larger than the thickness TP 19 of the second p-type semiconductor region 19. When a reverse bias is applied to the first p-n junction 23a, the first p-type semiconductor region 15 (the first p-type semiconductor layer 35b) is easily depleted of carriers. Therefore, an optical absorption loss due to carriers is reduced in the first p-type semiconductor region 15 (the first p-type semiconductor layer 35b). For example, the thickness TP15 of the first p-type semiconductor region 15 is 75 nm. The thickness TP19 of the second p-type semiconductor region 19 is 50 nm. Preferably, the thickness TP15 of the first p-type semiconductor region 15 is 50 nm or more and 150 nm or less. The thickness TP19 of the second p-type semiconductor region 19 is 30 nm or more and 100 nm or less.

In the first p-n junction 23a, the dopant concentration N15 of the first p-type semiconductor region 15 (for example, the first p-type semiconductor layer 35b) is preferably lower than the dopant concentration N13 of the first n-type semiconductor region 13 (for example, the n-type semiconductor layer 35a). In the first p-n junction 23a, when the dopant concentration N15 of the first p-type semiconductor region 15 (for example, the first p-type semiconductor layer 35b) is lower than the dopant concentration N13 of the first n-type semiconductor region 13 (for example, the n-type semiconductor layer 35a), a depletion region easily extends toward the first p-type semiconductor region 15 when a reverse bias is applied to the first p-n junction 23a. Therefore, the first p-type semiconductor region 15 is more depleted than the first n-type semiconductor region 13 (for example, the n-type semiconductor layer 35a). For example, the dopant concentration N35a of the n-type semiconductor layer 35a in the first n-type semiconductor region 13 is $4.0 \times 10^{17}$ cm$^{-3}$. The dopant concentration N35b of the first p-type semiconductor region 15 (or the first p-type semiconductor layer 35b) is $1.0 \times 10^{17}$ cm$^{-3}$. Preferably, the dopant concentration N35a of the n-type semiconductor layer 35a in the first n-type semiconductor region 13 is $2.0 \times 10^{17}$ cm$^{-3}$ or more and $2.0 \times 10^{18}$ cm$^{-3}$ or less. The dopant concentration N35b of the first p-type semiconductor region 15 (or the first p-type semiconductor layer 35b) is preferably $4.0 \times 10^{16}$ cm$^{-3}$ or more and $5.0 \times 10^{17}$ cm$^{-3}$ or less.

The semiconductor optical modulator 11 may further include a first electrode 37 for applying a voltage (electrical potential) to the first cladding layer 31 and a second electrode 39 for applying a voltage (electrical potential) to the second cladding layer 33. The first electrode 37 is disposed on a substrate 51. In the embodiment, the first electrode 37 is disposed on the contact layer 53 disposed on the substrate 51. The second electrode 39 is disposed on the second cladding layer 33. In the embodiment, the second electrode 39 is disposed on the n-type semiconductor layer 33a2 in the n-type semiconductor layer 33a. In the first p-n junction 23a, the dopant concentration of the first p-type semiconductor layer 35b in the first p-type semiconductor region 15 is preferably equal to or less than $4 \times 10^{17}$ cm$^3$. The dopant concentration of the n-type semiconductor layer 35a in the first n-type semiconductor region 13 is preferably equal to or more than $4 \times 10^{17}$ cm$^3$. In this structure, the first p-type semiconductor layer 35b in the first p-type semiconductor region 15 in the first p-n junction 23a is almost completely depleted at zero bias.

With reference to FIG. 1B, the core layer 35 may be a single semiconductor layer. The core layer 35 is made of, for example, a III-V compound semiconductor. The core layer 35 may include a bulk core region containing at least one of AlGaInAs and GaInAsP.

With reference to FIGS. 1A and 1B, the first n-type semiconductor region 13, the first p-type semiconductor region 15, the i-type semiconductor region 17, the second p-type semiconductor region 19, and the second n-type semiconductor region 21 constitute a stacked layer structure. This stacked layer structure includes the first cladding layer 31, the core layer 35, and the second cladding layer 33. The first p-n junction 23a is disposed in an intermediate region between the first cladding layer 31 and the second cladding layer 33. The intermediate region or the second cladding layer 33 includes the second p-n junction 23b. The intermediate region includes the core layer 35. The first n-type semiconductor region 13 includes the first cladding layer 31, and the second n-type semiconductor region 21 includes part or all of the second cladding layer 33.

The core layer 35 is a single semiconductor layer (for example, a bulk). The core layer 35 is not limited to this structure. For example, as illustrated in FIG. 2A, the core layer 35 according to another embodiment has a multiple-quantum-well (MQW) structure 40. The multiple-quantum-well (MQW) structure 40 includes alternately arranged barrier layers 41 and well layers 43. The barrier layers 41 and well layers 43 are made of, for example, a III-V compound semiconductor. In the semiconductor optical modulator 11, the combination of the materials of the well layers 43 and the barrier layers 41 (the material of the well layers 43/the material of the barrier layers 41) is (AlGaInAs/AlInAs), (AlGaInAs/AlGaInAs), or (GaInAsP/GaInAsP). The bandgap energy of the barrier layers 41 is higher than the bandgap energy of the well layers 43.

As illustrated in FIG. 2B, the semiconductor optical modulator 11 may further include a first optical guide layer 45 and a second optical guide layer 47. The first optical guide layer 45 and the second optical guide layer 47 are disposed in the intermediate region described above. The first optical guide layer 45 is disposed between the first cladding layer 31 and the core layer 35. The second optical guide layer 47 is disposed between the second cladding layer 33 and the core layer 35. Preferably, the first optical guide layer 45 includes the first p-n junction 23a, and the second optical guide layer 47 includes the second p-n junction 23b. Light passing through an optical waveguide of the semiconductor optical modulator is more strongly confined in the core layer disposed between the first and second optical guide layers 45 and 47 having the band diagram illustrated in FIG. 2B. The core layer 35 may be a bulk or have a quantum well (QW) structure. The first p-n junction 23a may be disposed in the core layer 35, and the second p-n junction 23b may be disposed in the second optical guide layer 47. The second p-n junction 23b may be disposed in the second cladding layer 33, and the first p-n junction 23a may be disposed in the core layer 35. In addition, the second p-n junction 23b may be disposed in the second cladding layer 33, the first p-n junction 23a may be disposed in the first optical guide layer 45.

In the semiconductor optical modulator 11, as illustrated in FIG. 2C, the core layer 35 preferably includes the first p-n junction 23a and the second p-n junction 23b. In this case, an electric field is effectively applied to the region from the first p-n junction 23a to the second p-n junction 23b in the core layer 35. A p-type semiconductor layer (the first p-type semiconductor layer 35b, the first p-type semiconductor region 15) constituting the first p-n junction 23a is depleted of carriers when the first p-n junction 23a is reverse biased.

In the semiconductor optical modulator 11, preferably, the first p-n junction 23a is disposed in the first optical guide layer 45 or the core layer 35, and the second p-n junction 23b is disposed in the second cladding layer 33. When the core layer 35 includes the first p-n junction 23a, a large electric field is generated in the core layer 35 and in a region including the first p-n junction 23a when a reverse bias is applied to the first p-n junction 23a.

Referring back to FIGS. 1A and 1B, the semiconductor optical modulator 11 further includes a semiconductor substrate 51 and an n-type contact layer 53 disposed on the substrate 51. For example, the substrate 51 is made of a semi-insulating III-V compound semiconductor such as Fe-doped InP. The contact layer 53 is made of a III-V compound semiconductor such as InP and InGaAsP. The contact layer 53 includes a first portion 53a and a second portion 53b. The first portion 53a and the second portion 53b of the contact layer 53 are disposed on a main surface 51a of the substrate 51. The first electrode 37 is in contact with the first portion 53a of the contact layer 53. The second electrode 39 is disposed above the second portion 53b of the contact layer 53. The first cladding layer 31, the core layer 35, and the second cladding layer 33 constitute a stacked layer structure 55 on the second portion 53b of the contact layer 53. The second electrode 39 is in contact with the top surface 55a of the stacked layer structure 55. In the embodiment, the second electrode 39 is disposed on the top surface of the n-type semiconductor layer 33a2 in the n-type semiconductor layer 33a. The stacked layer structure 55 includes the first n-type semiconductor region 13, the first p-type semiconductor region 15, the i-type semiconductor region 17, the second p-type semiconductor region 19, and the second n-type semiconductor region 21. The first cladding layer 31, the core layer 35, and the second cladding layer 33 are arranged along a normal line NX of the main surface 51a of the substrate 51. The first cladding layer 31, the first optical guide layer 45, the core layer 35, the second optical guide layer 47, and the second cladding layer 33 are also arranged along a normal line NX of the main surface 51a of the substrate 51 (see FIGS. 2A to 2C).

The semiconductor optical modulator 11 includes the first electrode 37 on the contact layer 53 disposed on the main surface 51a of the semi-insulating substrate 51. A voltage is applied to the first cladding layer 31 through the contact layer 53 and the first electrode 37. The distance between the core layer 35 and the first electrode 37 disposed on the contact layer 53 is shorter than the distance between the core layer and the electrode in a structure in which the electrode is disposed on the back side of the substrate. Use of the semi-insulating substrate 51 can reduce parasitic capacitance.

Examples of the present embodiments will be further described below. For the semiconductor optical modulator 11, a refractive index of an optical waveguide is changed by using the electro-optical effect, thereby causing an optical phase change in light propagating through the optical waveguide. Such a modulator can be applied to optical phase modulators, optical intensity modulators including a Mach-Zehnder (MZ) interferometer, and high-performance optical switches composed of many waveguides.

EXAMPLES

Device Structure 1

A device structure 1 of the semiconductor optical modulator 11 according to an embodiment is as follows:

Component, Material, Thickness (nm), Conductive type, Dopant concentration, Dopant.

Substrate 51, InP, - - -, Semi-insulating, - - -, Fe (iron).
Contact layer 53, InP, 500, n-type, 1E+18, Si (silicon).
Cladding layer 31, InP, 300, n-type, 5E+17, Si (silicon).
Core layer 35a, InGaAlAs, 10, n-type, 5E+17, Si (silicon).
Core layer 35b, InGaAlAs, 70, p-type, 1E+17, Zn (zinc).
Core layer 35c, InGaAlAs, 300, i-type, - - -, undoped.
Core layer 35d, InGaAlAs, 20, p-type, 1E+17, Zn (zinc).
Cladding layer 33b, InP, 50, p-type, 1E+17, Zn (zinc).
Cladding layer 33a1, InP, 300, n-type, 5E+17, Si (silicon).
Cladding layer 33a2, InP, 900, n-type, 1E+18, Si (silicon).

The thickness is expressed in nanometer (nm). The dopant concentration is expressed in $cm^{-3}$. A dopant concentration "1E+18" represents $1 \times 10^{18}$. The III-V compound semiconductor InGaAlAs has a composition of $In_{0.53}Ga_{0.32}Al_{0.15}As$, for example. The material of the electrode is Au/Ni/AuGe/Ni/Au, for example. The total thickness of the electrode is 2000 nm, for example.

FIG. 3 is a potential profile of the semiconductor optical modulator 11 having the device structure 1. The voltage applied to the semiconductor optical modulator 11 is "0 V" or "−5 V". At an applied voltage of 0 V, a sufficiently high potential barrier (a barrier to a leakage current) can be formed between the two n-type cladding layers because of the two p-n junctions. The voltage applied to the semiconductor optical modulator 11 is mostly applied to the core layer because the p-n junction is formed in the core layer. A p-type semiconductor layer constituting the p-n junction formed in the core layer is depleted of carriers when the p-n junction formed in the core layer is reverse biased.

Device Structure 2

Another device structure of the semiconductor optical modulator for a comparative example is as follows:

Component, Material, Thickness (nm), Conductive type, Dopant concentration, Dopant.

Substrate, InP, - - -, Semi-insulating, - - -, Fe (iron).
Contact layer, InP, 500, n-type, 1E+18, Si (silicon).
Cladding layer, InP, 300, n-type, 5E+17, Si (silicon).
Core layer, InGaAlAs, 400, i-type, - - -, undoped.
Cladding layer, InP, 100, i-type, - - -, undoped.
Cladding layer, InP, 100, p-type, 1E+17, Zn (zinc).
Cladding layer, InP, 150, n-type, 5E+17, Si (silicon).
Cladding layer, InP, 900, n-type, 1E+18, Si (silicon).

The thickness is expressed in nanometer (nm). The dopant concentration is expressed in $cm^{-3}$. The III-V compound semiconductor InGaAlAs has a composition of $In_{0.53}Ga_{0.32}Al_{0.15}As$, for example. The material of the electrode is Au/Ni/AuGe/Ni/Au, for example. The total thickness of the electrode is 2000 nm, for example.

Figure 4:
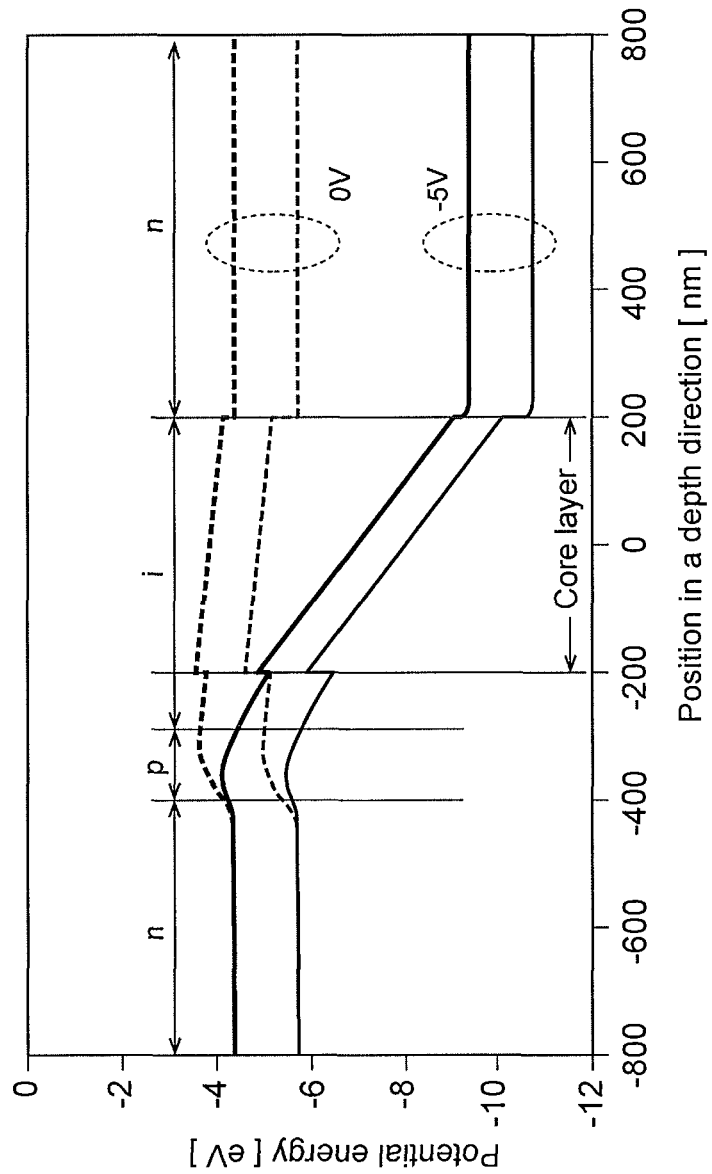
FIG. 4 is a potential profile of a semiconductor optical modulator having a device structure 2.

FIG. 4 is a potential profile of the semiconductor optical modulator 11 having the device structure 2. The voltage applied to the semiconductor optical modulator 11 is "0 V" or "−5 V". At an applied voltage of 0 V, the potential of the core layer or the i-layer has a gradual slope. The potential barrier of the device structure 1 has higher barrier performance with respect to leakage current than the potential barrier of the device structure 2. Since the device structure 2 includes the p-n junction on the outside of the core layer, a voltage is applied to a wide region from the core layer to the p-n junction on the outside of the core layer. In contrast, the device structure 1 includes the p-n junction within the core layer, and the electric field is concentrated in the core layer. Thus, the electric field in the core layer of the device structure 1 is larger than the electric field in the core layer of the device structure 2.

Figure 5:
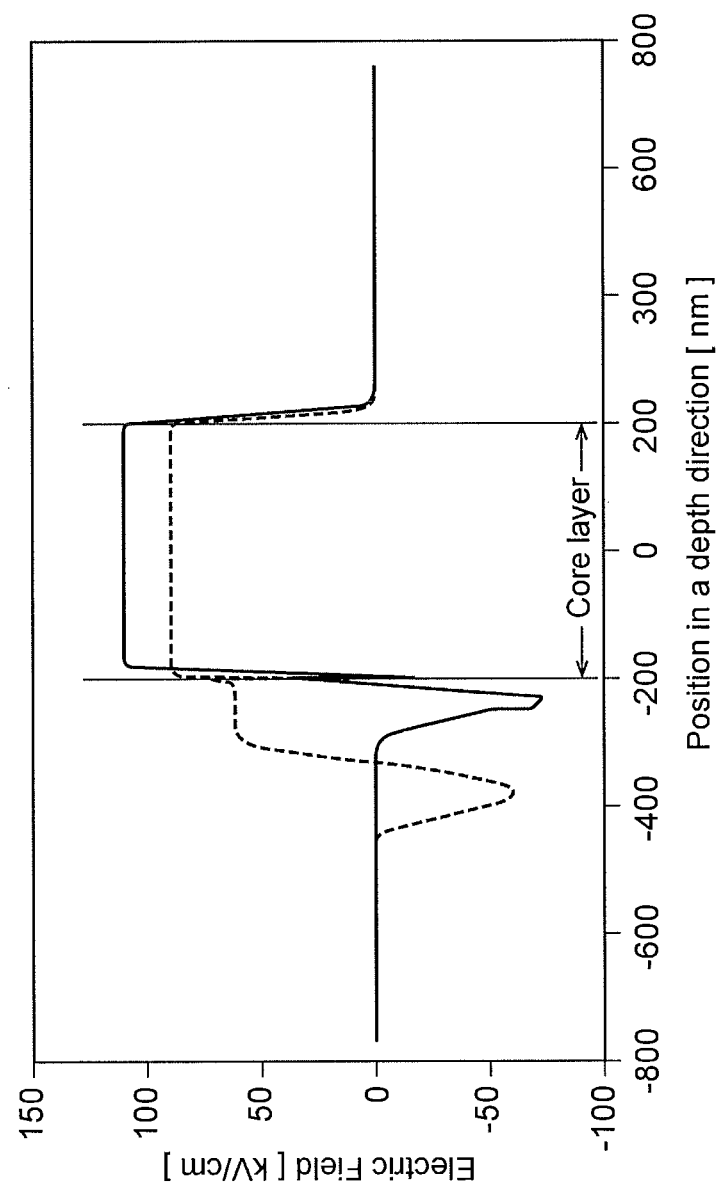
FIG. 5 is the electric field profiles of the device structure 1 and the device structure 2.

FIG. 5 shows the electric field profiles of the device structure 1 and the device structure 2. In FIG. 5, the solid line indicates an electric filed in the device structure 1, and the broken line indicates an electric field in the device structure 2. The device structure 1 and the device structure 2 have the same core layer thickness. The voltages applied to the device structure 1 and the device structure 2 are also the same. As described above, however, the electric field in the core layer of the device structure 1 is larger than the electric field in the core layer of the device structure 2.

Figure 6:
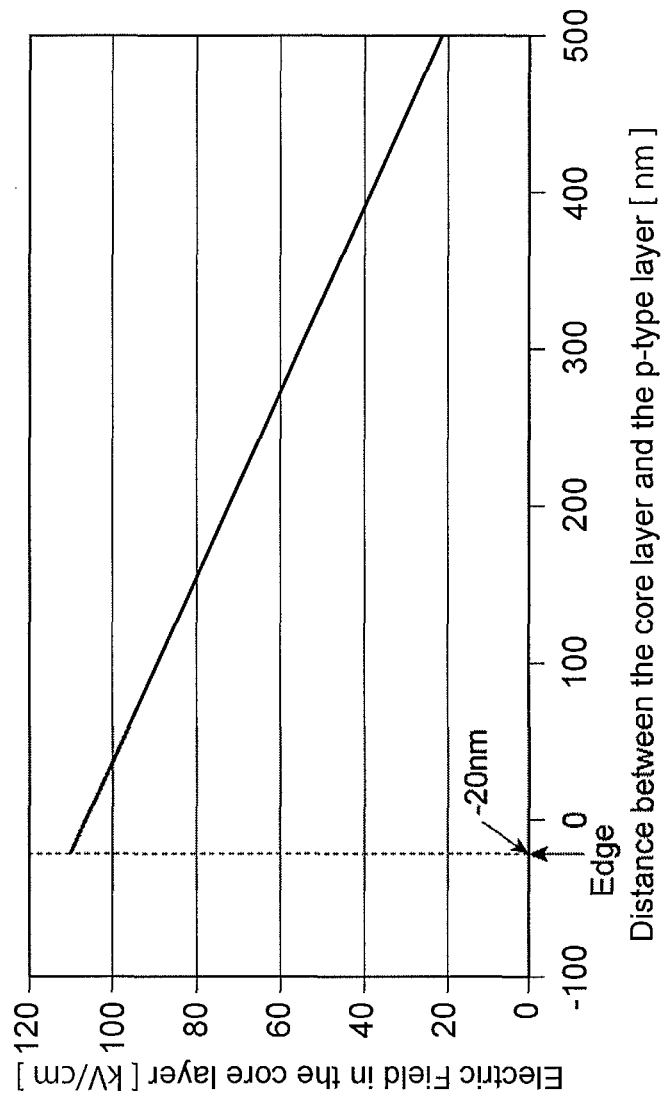
FIG. 6 is a graph showing the electric field in a core layer in the device structure 1 according to an example as a function of the distance between an edge of the core layer and a p-type semiconductor layer.

FIG. 6 shows an electric field in the core layer as a function of the distance from the interface between the core layer and a cladding layer to an edge of the p-type semiconductor layer in the second p-type semiconductor region 19 along the normal line NX for the device structure 1. Specifically, in FIG. 6, the maximum electric field in the core layer is plotted for structures in which the end position of the p-type semiconductor layer in the second p-type semiconductor region 19 is changed from a position of −20 nm away from the edge of the core layer to a position on the outside of the core layer toward the second cladding layer 33 in the device structure 1. FIG. 6 shows that the end of the p-type semiconductor layer is preferably disposed in the core layer of the device structure 1 so that the p-n junction (in the embodiment, p-i junction) is disposed in the core layer, thereby increasing the electric field in the core layer. In FIG. 6, zero (the position of the origin) on the horizontal axis indicates that the end of the p-type semiconductor layer is disposed on the edge of the core layer. A negative distance on the horizontal axis indicates that the end of the p-type semiconductor layer is disposed within the core layer. A positive distance on the horizontal axis indicates that the end of the p-type semiconductor layer is disposed on the outside of the core layer. In the embodiment, the p-type InGaAlAs core layer (the second p-type semiconductor layer 35d) has a thickness of 20 nm for the device structure 1. The edge of the p-type InGaAlAs core layer (the second p-type semiconductor layer 35d) is positioned at the position of −20 nm away from the interface between the core layer 35 and the second cladding layer 33. Therefore, the device structure 1 in the embodiment has the electric field in the core layer at the position of −20 nm on the horizontal axis in FIG. 6.

Figure 7:
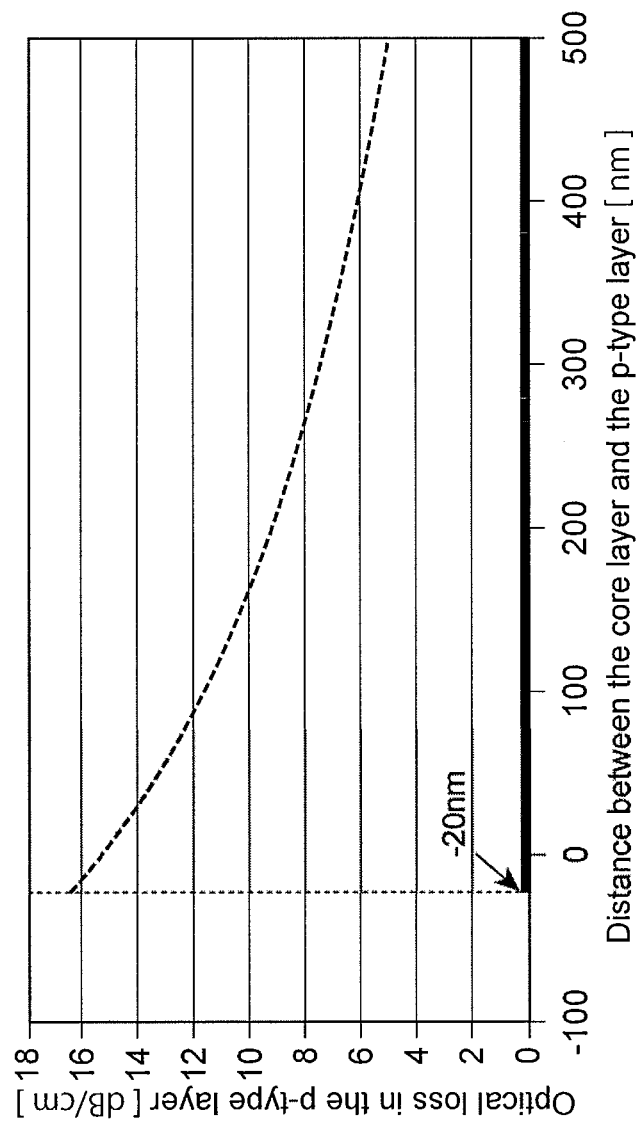
FIG. 7 is a graph showing optical loss in the p-type semiconductor layer in the device structure 1 according to an example as a function of the distance between the edge of the core layer and the p-type semiconductor layer.

FIG. 7 shows an optical loss (optical absorption loss) in the p-type semiconductor layer in the second p-type semiconductor region 19 as a function of the distance from the interface between the core layer and a cladding layer to an edge of the p-type semiconductor layer along the normal line NX for the device structure 1. Specifically, in FIG. 7, the optical loss in the p-type semiconductor layer is plotted for structures in which the end position of the p-type semiconductor layer in the second p-type semiconductor region 19 is changed from a position of −20 nm away from the edge of the core layer to a position on the outside of the core layer toward the second cladding layer 33 in the device structure 1. In the device structure 1, the p-type InGaAlAs core layer (the second p-type semiconductor layer 35d) has a thickness of 20 nm Therefore, the device structure 1 in the embodiment has the optical loss at the position of −20 nm on the horizontal axis in FIG. 7. In FIG. 7, the solid line indicates the optical loss when an external voltage (for example, 5 V) is applied such that the p-type semiconductor layers in the core layer 35 are depleted. The broken line indicates the optical loss when an external voltage (for example, 0 V) is applied such that the p-type semiconductor layers in the core layer 35 are partially depleted or are not depleted. For example, when a −5 V modulation voltage is applied to the modulator, the optical absorption of the p-type semiconductor layer in the core layer of the device structure 1 is substantially zero because of the depletion of the p-type semiconductor layer (for example, the second p-type semiconductor layer 35d) in the second p-type semiconductor region 19 (see the solid line).

Figure 8:
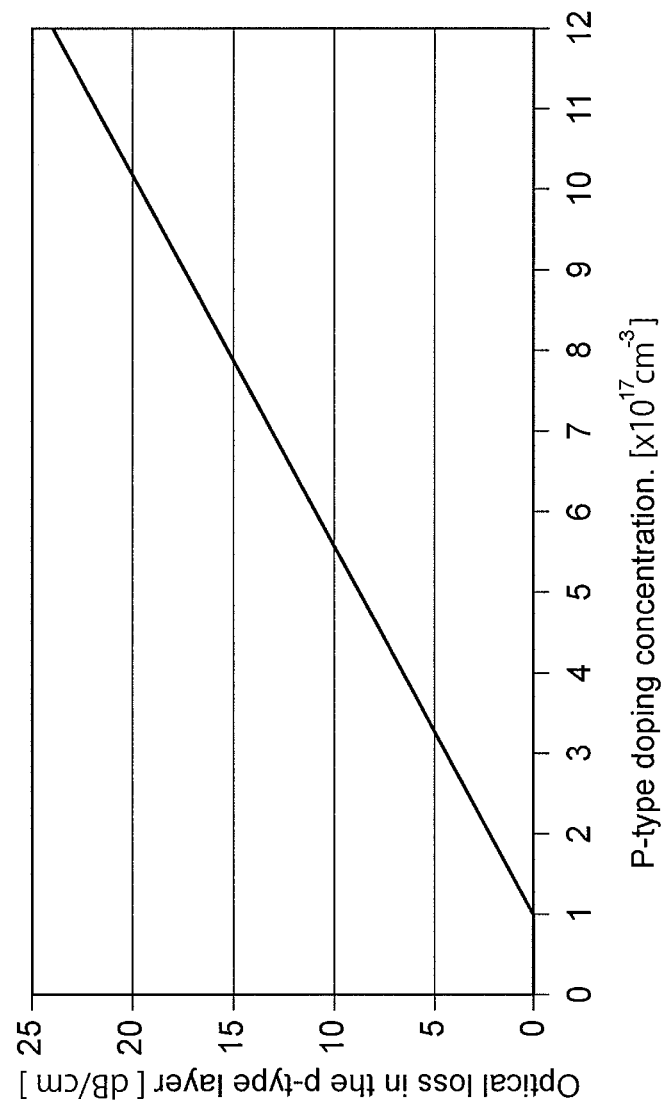
FIG. 8 is a graph showing optical loss in the p-type semiconductor layer in the device structure 1 according to an example as a function of the p-dopant concentration of the p-type semiconductor layer.

FIG. 8 shows an optical loss in the p-type semiconductor layer in the second p-type semiconductor region 19 as a function of the p-dopant concentration of the p-type semiconductor layer for the device structure 1. FIG. 8 shows the optical loss in the p-type semiconductor layer when the distance from the interface between the core layer and a cladding layer to an edge of the p-type semiconductor layer is −20 nm. This distance corresponds to the structure having the p-type InGaAlAs core layer (the second p-type semiconductor layer 35d) with a thickness of 20 nm. The degree of depletion of the p-type semiconductor layer decreases with increasing p-dopant concentration of the p-type semiconductor layer in the second p-type semiconductor region 19. Thus, the optical loss in the p-type semiconductor layer increases as the p-dopant concentration of the p-type semiconductor layer increases. The horizontal axis is expressed in $10^{17}$ cm$^{-3}$.

An optical waveguide structure for modulation preferably includes a high-mesa waveguide, as illustrated in FIG. 1A. The core layer has a higher refractive index than the cladding layers. Light is confined in a high-refractive-index region. In order to utilize this property of light, an optical guide layer (or a separate confinement heterostructure (SCH) layer) having a refractive index between the refractive index of the core layer and the refractive index of a cladding layer can be disposed between the core layer and the cladding layer.

The electrical conductivity of a semiconductor can be controlled by the addition of a p-type dopant or an n-type dopant. Any semiconductor in the core layer, the cladding layers, and the optical guide layer may be doped. For example, a doping profile from one cladding layer to the other cladding layer through the core layer may be formed to impart n/p electrical conductivity.

In order to increase the ratio of the voltage applied to the core layer to the external applied voltage to improve modulation efficiency, a voltage reduction in the p-n junction (−400 to −200 nm on the horizontal axis) in FIG. 4 must be reduced. To this end, the p-n junction may be moved from the cladding layer to the vicinity of the core layer. However, when the p-n junction is formed in the core layer, the p-type semiconductor having a high optical absorption is disposed in an optical waveguide region, thereby increasing an optical loss. In addition, to increases the electric field in the core layer, the p-n junction is formed in the core layer. This, however, results in a significant optical loss because of introducing the p-type semiconductor layer in the core layer, as described above. Patent Literature 1 avoids the significant optical loss caused by the presence of the p-type semiconductor layer in the core layer.

However, by forming a depletion region in the p-type semiconductor layer, an optical loss in the core layer is reduced. For example, the p-type dopant concentration and the thickness of a p-type region can be controlled to almost completely deplete the p-type region. However, a low p-type dopant concentration and a thin p-type region result in a decrease in the potential barrier of the p-n junction. This decrease results in an increase in leakage current. In addition, since an electric field exists around the p-n junction in the core layer when no voltage is applied (OFF), this decreases the difference in electric field between the application of no voltage (OFF) and the application of a voltage (ON), thereby decreasing modulation efficiency.

As illustrated in the potential diagrams of FIGS. 2A to 2C, in the device structure according to the present embodiment, the p-type region of one p-n junction to which a reverse bias is applied is disposed in the core layer, and the other p-n junction is disposed within the core layer or on the outside of the core layer. This extends the potential barrier region over almost the entire core layer to reduce leakage current. The p-type region of the p-n junction to which a reverse bias is applied is depleted (desirably almost completely) to reduce an optical absorption. The two p-n junctions are disposed in opposite directions, and the p-type regions are disposed in the vicinity of each end of the core layer. This improves potential flatness over almost the entire core layer when no voltage is applied (OFF), making the potential substantially flat. Thus, when no voltage is applied (OFF), the internal electric field can be negligibly small. Since the p-type regions are disposed in a region containing the core layer rather than the cladding layer away from the core layer, upon the application of a voltage (ON), almost all the external voltage is applied to the core layer. Thus, the electric field is substantially increased to its maximum. Since the p-type regions are effectively depleted, optical loss with respect to the holes of the p-type semiconductor can be markedly reduced. Comparing the device structure 1 with the device structure 2 in FIG. 5, the electric field in the core layer of the device structure 1 can be higher by approximately 20% than that of the device structure 2.

As shown by the present example, in a waveguide of the optical modulator including the n-type cladding layers on both sides, the $n^+$-$p^-$-i-$p^-$-$n^+$ structure having the p-type regions in the vicinity of each end of the core layer can reduce leakage current and increase the electric field in the core layer. In the $n^+$-$p^-$-i-$p^-$-$n^+$ structure, part of at least one of two or more p-type semiconductor regions is disposed in the core layer. In order to effectively deplete the p-type semiconductor region, for example, the p-type semiconductor region preferably has a dopant concentration of $4\times10^{16}$ cm$^{-3}$ or more and $4\times10^{17}$ cm$^{-3}$ or less and a thickness of 50 nm or more and 150 nm or less.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A semiconductor optical modulator, comprising:
a first n-type semiconductor region;
a second n-type semiconductor region;
a first p-type semiconductor region between the first n-type semiconductor region and the second n-type semiconductor region;
a second p-type semiconductor region between the first p-type semiconductor region and the second n-type semiconductor region; and
an i-type semiconductor region between the first p-type semiconductor region and the second p-type semiconductor region,
wherein the first n-type semiconductor region, the first p-type semiconductor region, the i-type semiconductor region, the second p-type semiconductor region, and the second n-type semiconductor region constitute a stacked layer structure, the stacked layer structure includes a first cladding layer, a second cladding layer, and a core layer disposed between the first cladding layer and the second cladding layer, the first n-type semiconductor region and the first p-type semiconductor region form a first p-n junction disposed in an intermediate region between the first cladding layer and the second cladding layer, the second p-type semiconductor region and the second n-type semiconductor region form a second p-n junction disposed in the intermediate region or the second cladding layer, the intermediate region includes the core layer, the first n-type semiconductor region includes the first cladding layer, the second n-type semiconductor region includes part or all of the second cladding layer, the first p-type semiconductor region and the i-type semiconductor region form a first p-i junction, and the i-type semiconductor region and the second p-type semiconductor region form a second p-i junction.

2. The semiconductor optical modulator according to claim 1, wherein, in the first p-n junction, the first p-type semiconductor region has a lower dopant concentration than that of the first n-type semiconductor region.

3. The semiconductor optical modulator according to claim 1, wherein the first p-type semiconductor region has a thickness equal to or larger than the thickness of the second p-type semiconductor region.

4. The semiconductor optical modulator according to claim 1, further comprising:
a first electrode for supplying an electrical potential to the first cladding layer; and
a second electrode for supplying an electrical potential to the second cladding layer,
wherein, in the first p-n junction, the first p-type semiconductor region includes a portion having a dopant concentration of $4 \times 10^{17}$ cm$^{-3}$ or less,
the portion of the first p-type semiconductor region has a thickness of 150 nm or less, and
the first n-type semiconductor region has a dopant concentration of more than $4 \times 10^{17}$ cm$^3$.

5. The semiconductor optical modulator according to claim 1, wherein the core layer has a multiple-quantum-well structure including a well layer and a barrier layer, and
the material of the well layer and the material of the barrier layer are AlGaInAs and AlInAs, AlGaInAs and AlGaInAs, or GaInAsP and GaInAsP, respectively.

6. The semiconductor optical modulator according to claim 1, wherein the core layer contains at least one of AlGaInAs and GaInAsP.

7. The semiconductor optical modulator according to claim 1, further comprising:
a first optical guide layer between the first cladding layer and the core layer; and
a second optical guide layer between the second cladding layer and the core layer,
wherein the first optical guide layer includes the first p-n junction.

8. The semiconductor optical modulator according to claim 1, wherein the core layer includes the first p-n junction and the second p-n junction.

9. The semiconductor optical modulator according to claim 1, wherein the first p-n junction is disposed in the core layer, and the second p-n junction is disposed in the second cladding layer.

10. The semiconductor optical modulator according to claim 1, further comprising:
a substrate made of a semi-insulating material;
a contact layer made of an n-type semiconductor, the contact layer including a first portion and a second portion arranged on a main surface of the substrate;
a first electrode for supplying an electrical potential to the first cladding layer; and
a second electrode for supplying an electrical potential to the second cladding layer,
wherein the stacked layer structure is disposed on the second portion of the contact layer,
the first electrode is disposed on the first portion of the contact layer,
the second electrode is disposed on the top surface of the stacked layer structure, and
the first cladding layer, the core layer, and the second cladding layer are arranged along a normal line of the main surface of the substrate.

* * * * *